US012812239B2

(12) United States Patent
Seki et al.

(10) Patent No.: US 12,812,239 B2
(45) Date of Patent: Nov. 24, 2026

(54) ELECTRONIC DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventors: Takashi Seki, Kanagawa (JP); Takumi Nishimoto, Kanagawa (JP); Toshimichi Ise, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 19/051,490

(22) Filed: Feb. 12, 2025

(65) Prior Publication Data

US 2025/0280194 A1 Sep. 4, 2025

(30) Foreign Application Priority Data

Mar. 4, 2024 (JP) ................................ 2024-031911

(51) Int. Cl.
*H04N 23/65* (2023.01)

(52) U.S. Cl.
CPC ........... *H04N 23/65* (2023.01); *H04N 23/651* (2023.01)

(58) Field of Classification Search
None
See application file for complete search history.

(56) References Cited

U.S. PATENT DOCUMENTS

2002/0158987 A1* 10/2002 Shimizu ................. H04N 23/73 348/E5.025
2007/0214296 A1* 9/2007 Takamatsu .............. H02J 7/663 710/63
2008/0018174 A1* 1/2008 Yang ......................... H02J 7/08 307/80
2012/0043821 A1* 2/2012 Lee ..................... H02J 13/1321 320/137
2013/0339757 A1* 12/2013 Reddy ................... G06F 1/3212 713/300
2015/0253830 A1* 9/2015 Montero ................... G06F 1/28 713/340

(Continued)

FOREIGN PATENT DOCUMENTS

JP 2006115250 A 4/2006
JP 2020154097 A 9/2020

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

In a case where a first power supply and a second power supply are connected to an electronic device, the electronic device acquires first information on the first power supply and second information on the second power supply, and determines, among the first power supply and the second power supply, a power supply having a larger suppliable electric power as a power supply to be used for an operation of the electronic device, and in a case where the second power supply is determined as the power supply to be used for the operation of the electronic device, the electronic device sets a first operation mode if a first electric power that is suppliable by the first power supply is larger than a threshold power, and sets a second operation mode if the first electric power is smaller than the threshold power.

11 Claims, 6 Drawing Sheets

(56) References Cited

U.S. PATENT DOCUMENTS

| | | | | |
|---|---|---|---|---|
| 2016/0192526 | A1* | 6/2016 | Gao | G06F 1/1632<br>361/679.01 |
| 2019/0204896 | A1* | 7/2019 | Kitanosako | G06F 1/263 |
| 2021/0034139 | A1* | 2/2021 | Tsujimoto | G06F 1/26 |

* cited by examiner

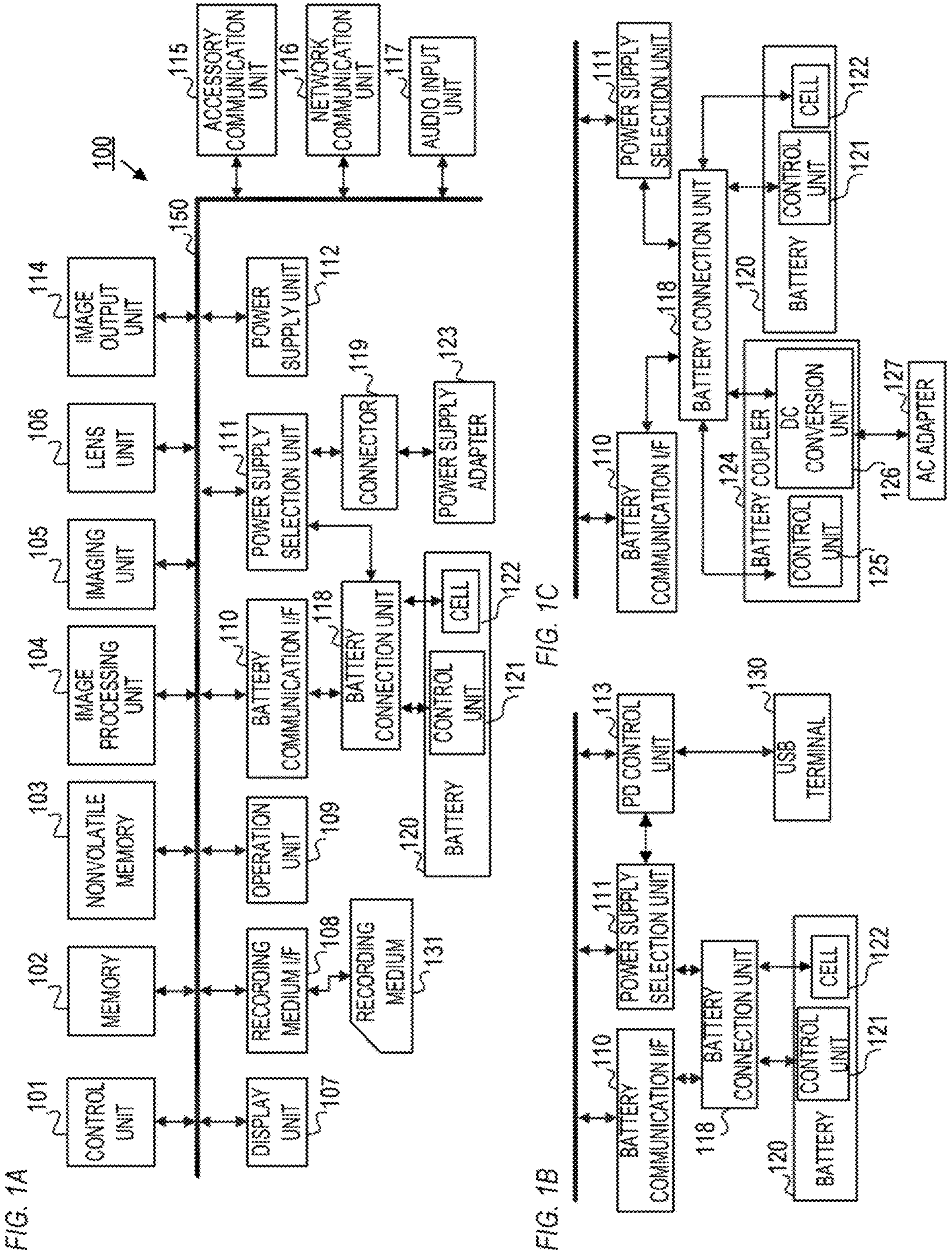
FIG. 1A
100
101 CONTROL UNIT
102 MEMORY
103 NONVOLATILE MEMORY
104 IMAGE PROCESSING UNIT
105 IMAGING UNIT
106 LENS UNIT
114 IMAGE OUTPUT UNIT
150
115 ACCESSORY COMMUNICATION UNIT
116 NETWORK COMMUNICATION UNIT
117 AUDIO INPUT UNIT
107 DISPLAY UNIT
108 RECORDING MEDIUM I/F
131 RECORDING MEDIUM
109 OPERATION UNIT
110 BATTERY COMMUNICATION I/F
118 BATTERY CONNECTION UNIT
111 POWER SUPPLY SELECTION UNIT
119 CONNECTOR
123 POWER SUPPLY ADAPTER
112 POWER SUPPLY UNIT
120 BATTERY
121 CONTROL UNIT
122 CELL
FIG. 1B
110 BATTERY COMMUNICATION I/F
118 BATTERY CONNECTION UNIT
111 POWER SUPPLY SELECTION UNIT
113 PD CONTROL UNIT
130 USB TERMINAL
120 BATTERY
121 CONTROL UNIT
122 CELL
FIG. 1C
110 BATTERY COMMUNICATION I/F
118 BATTERY CONNECTION UNIT
111 POWER SUPPLY SELECTION UNIT
124 BATTERY COUPLER
125 CONTROL UNIT
126 DC CONVERSION UNIT
127 AC ADAPTER
120 BATTERY
121 CONTROL UNIT
122 CELL

FIG. 2

201

| FUNCTION | POWER CONSUMPTION [W] TURNED ON | POWER CONSUMPTION [W] TURNED OFF |
|---|---|---|
| NETWORK | 5 | 0.3 |
| ACCESSORY SHOE POWER SUPPLY | 3 | 0 |
| EXTERNAL MICROPHONE INPUT | 2 | 0 |
| LENS POWER SUPPLY | 8 | 0.3 |
| ... | ... | ... |
| OTHERS | 50 | / |

202

| OPERATION MODE | NETWORK | ACCESSORY SHOE POWER SUPPLY | EXTERNAL MICROPHONE INPUT | LENS POWER SUPPLY | ... | TOTAL ELECTRIC POWER |
|---|---|---|---|---|---|---|
| OPERATION MODE1 | ON | ON | ON | ON | ... | P1 |
| OPERATION MODE2 | ON | OFF | OFF | ON | ... | P2 |
| OPERATION MODE3 | ON | OFF | ON | ON | ... | P3 |
| ... | ... | ... | ... | ... | ... | ... |

301

| INFORMATION ACQUIRED FROM BATTERY |
|---|
| BATTERY ID |
| CAPACITY [%] |
| VOLTAGE [V] |
| CONSUMPTION CURRENT [mA] |
| DISCHARGEABLE REMAINING AMOUNT [mAh] |

302

| ID | RATED POWER [W] | RATED VOLTAGE [V] | RATED CURRENT [A] |
|---|---|---|---|
| 0×0001 | 90 | 12.0 | 8.0 |
| 0×0002 | 50 | 12.0 | 4.8 |
| ... | ... | ... | ... |

311

| INFORMATION ACQUIRED FROM BATTERY COUPLER |
|---|
| BATTERY ID |
| VOLTAGE [V] |
| CONSUMPTION CURRENT [mA] |

312

| ID | RATED POWER [W] | RATED VOLTAGE [V] | RATED CURRENT [A] |
|---|---|---|---|
| 0×1001 | 120 | 12.0 | 10.0 |
| 0×1002 | 160 | 16.0 | 10.0 |
| ... | ... | ... | ... |

ELECTRONIC DEVICE, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device, a control method of an electronic device, and a non-transitory computer readable medium.

Description of the Related Art

As a power source of the imaging apparatus, there are a case where a chargeable/dischargeable battery (hereinafter, referred to as a battery) known as a lithium ion battery is connected, and a case where an adapter (hereinafter, referred to as a power supply adapter) that applies a DC voltage is connected to the imaging apparatus. A plurality of power supplies can be connected to the imaging apparatus in many cases. When a plurality of power supplies is connected to the imaging apparatus, it is desirable that imaging can be stably continued even if an electric power supplied from a certain power supply is reduced or impaired. JP 2020-154097 A discloses a method of determining a battery to be used for an operation of an imaging apparatus based on an operation mode of the imaging apparatus and a voltage of each battery when a plurality of batteries is connected to the imaging apparatus.

In addition, electric power that is suppliable to the imaging apparatus is different between the battery and the power supply adapter in many cases. JP 2006-115250 A discloses a method of determining an executable operation mode from among a plurality of operation modes based on whether electric power is supplied from a power supply adaptor when a plurality of power supplies are connected to an imaging apparatus.

However, in the technique disclosed in JP 2020-154097 A, when there is a battery in which the suppliable electric power is larger than the threshold voltage among the plurality of batteries connected to the imaging apparatus, the imaging apparatus receives supply of the electric power from the battery and operates in an operation mode requiring large power. However, the battery in use may be detached from the imaging apparatus due to a factor not intended by the user, and supply of the electric power from the battery may be instantaneously stopped. In the technique disclosed in JP 2006-115250 A, it is determined that the full operation mode can be executed if electric power is supplied from the power supply adaptor. However, the power supply adapter may be detached from the imaging apparatus due to a factor not intended by the user, and the supply of the electric power from the power supply adapter may be instantaneously stopped. In the techniques disclosed in JP 2020-154097 A and JP 2006-115250 A, when the supply of the electric power from the battery or the power supply adapter in use is instantaneously stopped due to a factor not intended by the user as described above, it is conceivable that another power supply connected to the imaging apparatus cannot cover the power necessary for the function in execution, and the function in execution cannot be normally stopped. For example, when supply of the electric power is instantaneously stopped due to an unintended factor during execution of the imaging function, it is conceivable that imaging is stopped. As a result, the recorded content is impaired.

SUMMARY OF THE INVENTION

The present invention provides a technique for preventing a function being executed from being stopped even when supply of the electric power is instantaneously stopped.

An electronic device according to the present invention includes: a processor; and a memory storing a program which, when executed by the processor, causes the electronic device to function as: an acquisition unit that acquires information on a power supply connected to the electronic device; a determination unit that determines a power supply to be used for an operation of the electronic device; and a setting unit that sets, as an operation mode of the electronic device, any of a plurality of operation modes including a first operation mode and a second operation mode in which a function that is usable is restricted as compared with the first operation mode, wherein in a case where a first power supply and a second power supply are connected to the electronic device, the acquisition unit acquires first information on the first power supply and second information on the second power supply, and the determination unit determines a power supply having a larger suppliable electric power among the first power supply and the second power supply as the power supply to be used for the operation of the electronic device based on the first information and the second information, and in a case where the second power supply is determined as the power supply to be used for the operation of the electronic device, the setting unit sets the operation mode of the electronic device in accordance with a first electric power that is suppliable by the first power supply such that if the first electric power is larger than a threshold power, the first operation mode is set, and if the first electric power is smaller than the threshold power, the second operation mode is set.

Further features of the present invention will become apparent from the following description of exemplary embodiments with reference to the attached drawings.

BRIEF DESCRIPTION OF THE DRAWINGS

FIGS. 1A to 1C are block diagrams illustrating a configuration of an imaging apparatus;

FIG. 2 is an explanatory diagram of electric power data;

DESCRIPTION OF THE EMBODIMENTS

Figure 3:
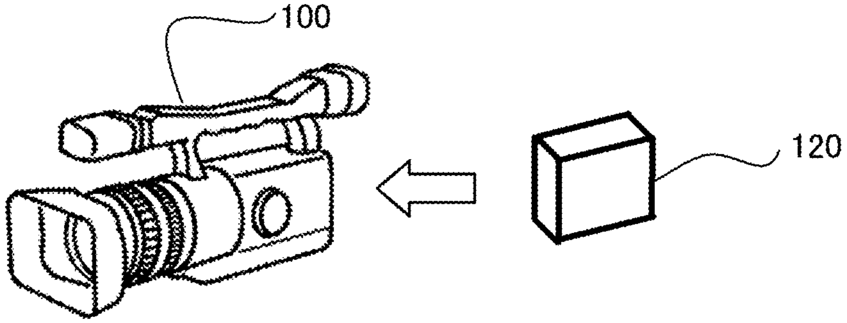
FIG. 3 is an explanatory diagram of information on a power supply.

In the description below, embodiments of the present invention are specifically described with reference to the accompanying drawings.

Configuration

FIG. 1A is a block diagram illustrating a configuration of an imaging apparatus 100 according to the present embodiment. The imaging apparatus 100 is an example of an electronic device. The imaging apparatus 100 includes a control unit 101, a memory 102, a nonvolatile memory 103, an image processing unit 104, an imaging unit 105, a lens unit 106, a display unit 107, a recording medium I/F 108, an operation unit 109, and a battery communication I/F 110. The imaging apparatus 100 further includes a power supply selection unit 111, a power supply unit 112, an image output unit 114, an accessory communication unit 115, a network communication unit 116, an audio input unit 117, a battery connection unit 118, and a connector 119. The functional units included in the imaging apparatus 100 input and output data to and from each other via an internal bus 150.

The control unit 101 is a central processing unit that controls each functional unit included in the imaging apparatus 100. The control unit 101 includes at least one processor and/or at least one circuit. That is, the control unit 101 may be a processor, may be a circuit, or may be a combination of a processor and a circuit. For example, the control unit 101 controls each functional unit of the imaging apparatus 100 using the memory 102 as a work memory according to a program stored in the nonvolatile memory 103.

The memory 102 is a volatile memory using a semiconductor element such as a random access memory (RAM).

The nonvolatile memory 103 stores image data, audio data, other data, and various programs for operating the control unit 101, and the like. The nonvolatile memory 103 is configured with, for example, a hard disk (HD), a read only memory (ROM), and the like. The program as used herein includes programs for executing the flowcharts described below.

The image processing unit 104 performs image processing on image data stored in the nonvolatile memory 103 or a recording medium 131, image data captured by the imaging unit 105, or the like. Examples of the image processing that are executed by the image processing unit 104 include A/D conversion processing, D/A conversion processing, and encoding processing, compression processing, decoding processing, enlargement/reduction processing (resizing), noise reduction processing, and color conversion processing of image data. The image processing unit 104 may be configured with a dedicated circuit block for executing specific image processing. In addition, depending on the type of image processing, the control unit 101 can execute image processing according to a program without using the image processing unit 104.

The imaging unit 105 is an imaging element such as a charge coupled device (CCD) sensor or a complementary MOS (CMOS) sensor. The imaging unit 105 can capture a still image or a moving image. The image data of the captured image is transmitted to the image processing unit 104, subjected to various types of image processing, and then recorded in the nonvolatile memory 103 or the recording medium 131 as a still image file or a moving image file, respectively.

The lens unit 106 is a lens unit configured with a zoom lens, a focus lens, a shutter, an aperture, a distance measuring unit, an A/D converter, and the like. The lens unit 106 can adjust a zoom, a focus, a diaphragm, and the like.

The display unit 107 displays an image and a graphical user interface (GUI) screen configuring a GUI. A video signal or the like generated by each functional unit of the imaging apparatus 100 is input to the display unit 107. The display unit 107 displays a video (image) based on the input video signal or the like. Note that, in the present embodiment, the imaging apparatus 100 includes the display unit 107, but the display unit 107 may be a monitor, a projector, or the like outside the imaging apparatus 100.

The image output unit 114 outputs an image, a GUI screen configuring a GUI, and the like to the outside. The image output unit 114 may output the same control signal as the display content of the display unit 107 to the outside or may output a control signal in which the display content is changed to the outside.

The recording medium I/F 108 is an interface with the recording medium 131 such as a memory card, a CD, or a DVD. The recording medium I/F 108 reads data from the recording medium 131 and writes data to the recording medium 131.

For example, the operation unit 109 is an input device for receiving a user operation that includes a character information input device such as a keyboard, a pointing device such as a mouse or a touch panel, a button, a dial, a joystick, a touch sensor, and a touch pad. Note that the touch panel is an input device configured to overlap the display unit 107 in a planar manner and output coordinate information corresponding to a position being touched. The control unit 101 is notified of the input user operation.

The battery connection unit 118 has a connection mechanism for connecting a battery 120. In addition, the battery connection unit 118 includes a plurality of terminals for connecting to a power supplying terminal and a communication terminal of the battery 120 when the battery 120 is connected. When the battery 120 is mounted to the battery connection unit 118, an electric power from a battery cell 122 is supplied to the power supply selection unit 111 via the power supplying terminal. In addition, when the battery 120 is connected to the battery connection unit 118, communication between a control unit 121 and the battery communication I/F 110 is performed via the communication terminal.

When the battery 120 is connected to the battery connection unit 118, the battery communication I/F 110 communicates with the control unit 121 via the battery connection unit 118 and acquires information on the type of the battery 120, the state of charge, the remaining amount, and the like of the battery cell 122. In addition, the battery communication I/F 110 transmits various types of information and commands to the control unit 121.

The power supply selection unit 111 is a power supply selection circuit that includes a power receiving unit receiving an electric power from the battery 120 and an electric power from a power supply adapter 123 and is configured with a comparator, a load switch, and the like. The power supply selection unit 111 selects (determines) one of the battery 120 and the power supply adapter 123 that can supply a higher electric power (power supply capability) as the power supply used for the operation of the imaging apparatus 100. For example, when the power supply adapter 123 is connected to the connector 119, the power supply selection unit 111 detects the output voltage of the power supply adapter 123. In addition, the power supply selection unit 111 detects the output voltage of the battery 120 when the battery 120 is connected to the battery connection unit 118. Then, when both the power supply adapter 123 and the battery 120 are connected, one of the power supply adapter 123 and the battery 120 having a higher output voltage is selected as the power source for the operation of the imaging apparatus 100. The control unit 101 performs control such that power from the selected one of the power supply adapter 123 and the battery 120 is used as the power source for the operation of the imaging apparatus 100 and power from the another of the power supply adapter 123 and the battery 120 is not used when the power is supplied from the selected one of the power supply adapter 123 and the battery 120. The control unit 101 performs control such that, in a case the power supply from the selected one of the power supply adapter 123 and the battery 120 which is being used as the power source for the operation of the imaging apparatus 100 is stopped, the power source for the operation of the imaging apparatus 100 is switched to the another of the power supply adapter 123 and the battery 120. The power supply selection unit 111 also acquires information on the connected battery 120 from the battery communication I/F 110 and transmits the information to the control unit 101. The control unit 101 performs control (display control) to display information on the connected battery 120.

The battery 120 is a power supply that supplies an electric power to the imaging apparatus 100. The battery 120 is a rechargeable battery (storage battery) and can be connected to (mounted to) and detached from the imaging apparatus 100. The battery 120 includes the control unit 121 and the battery cell 122. The amount of the electric power that the battery 120 can supply to the imaging apparatus 100 is limited by the amount of the electric power that the battery cell 122 has. In the battery 120, the electric power is supplied to the imaging apparatus 100 by the battery cell 122, and a charging state and a remaining capacity of the battery cell 122 are managed by the control unit 121. In the present embodiment, the battery 120 is connected to the battery connection unit 118 (and an internal terminal of the battery connection unit 118) provided inside the imaging apparatus 100. It can also be said that the battery 120 is an internal power supply of the imaging apparatus 100. Note that the battery 120 may be a non-rechargeable battery or may be a rechargeable battery provided integrally with the imaging apparatus 100.

The power supply adapter 123 is a power supply that supplies the electric power to the imaging apparatus 100. When the plug of the power supply adapter 123 is connected to the connector 119, the electric power from the power supply adapter 123 is supplied via the connector 119. Furthermore, the power supply adapter 123 can be connected to and detached from the imaging apparatus 100. The power supply adapter 123 converts, for example, the AC electric power supplied from a commercial power supply or the like into a DC electric power in a format suitable for the imaging apparatus 100 and supplies the converted power to the imaging apparatus 100. It can also be said that the power supply adapter 123 is connected to a power receiving unit (external terminal) provided outside the imaging apparatus 100, and the power supply adapter 123 that supplies the electric power from the outside of the imaging apparatus 100 is an external power source of the imaging apparatus 100.

The power supply unit 112 includes a DC-DC conversion circuit, converts a voltage from the power supply selected by the power supply selection unit 111 into a voltage necessary for each block of the imaging apparatus 100, and supplies the voltage to each block for a necessary period. The power supplying processing of the power supply unit 112 is controlled by the control unit 101 as described below.

The accessory communication unit 115 is a communication unit for communication with an accessory device mounted on the imaging apparatus 100. The accessory communication unit 115 acquires information from the accessory device or controls the accessory device according to an instruction of the control unit 101. For example, the accessory communication unit 115 causes the LED light mounted on the imaging apparatus 100 to emit light.

The network communication unit 116 includes a wireless communication circuit, a local area network (LAN) communication terminal, and the like and connects the imaging apparatus 100 to a network to perform various communications.

The audio input unit 117 receives an audio from an internal microphone provided in the imaging apparatus 100 or an external microphone connected to an audio input terminal. The audio signal input by the audio input unit 117 is processed as audio data by the control unit 101.

FIG. 1B is an example of a configuration of a main part of the imaging apparatus 100 in a case where a USB terminal 130 and a PD control unit 113 are used instead of the connector 119 in FIG. 1A.

The USB terminal 130 is a terminal conforming to the Universal Serial Bus (USB) standard and can receive the electric power supplied from an external USB power supply. Here, the USB terminal 130 is a USB Type-C terminal. An external power supplying device conforming to the USB Power Delivery (USB PD) standard is connected to the USB terminal 130.

When the power supplying device is connected to the USB terminal 130, the PD control unit 113 performs power receiving processing conforming to the USB PD standard. The PD control unit 113 performs predetermined negotiation (power supplying negotiation) with a power supplying device connected to the imaging apparatus 100 through communication conforming to the USB PD standard. The PD control unit 113 receives information on the electric power including voltage and current that is suppliable by the power supplying device connected to the USB terminal 130 and transmits the information on the electric power including voltage and current that is suppliable by the power supplying device connected to the power supply selection unit 111.

When both the battery 120 and the power supplying device are connected, the power supply selection unit 111 may determine the power supply having the larger voltage among the voltage that is suppliable by the power supplying device connected to the USB terminal 130 and the output voltage of the battery 120 as the power supply used for the operation of the imaging apparatus 100.

FIG. 1C is an example of a configuration of a main part of the imaging apparatus 100 in a case where a battery coupler 124 and an AC adapter 127 are used instead of the connector 119 and the power supply adapter 123 of FIG. 1A.

The battery coupler (DC coupler) 124 includes a control unit 125 and a DC conversion unit 126. The battery coupler 124 has the same shape as the battery 120. The battery 120 and the battery coupler 124 are connected to the imaging apparatus 100 in a state of being mounted to a battery grip (not illustrated). When the battery grip including the battery 120 and the battery coupler 124 is mounted to the imaging apparatus 100, the battery communication I/F 110 communicates with the control unit 121 and the control unit 125 to acquire various types of information from the battery 120 and the battery coupler 124. The control unit 101 can recognize the type of the battery coupler 124 based on the information from the battery communication I/F 110. The DC conversion unit 126 converts the electric power supplied from the AC adapter 127 into an electric power suitable for the imaging apparatus 100 and supplies the power to the imaging apparatus 100. The AC adapter 127 is a power supply that supplies the electric power to the battery coupler 124. When the plug of the AC adapter 127 is connected to a connector (not illustrated) of the battery coupler 124, the electric power from the AC adapter 127 is supplied to the DC conversion unit 126. The AC adapter 127 can be connected to and detached from the battery coupler 124. The AC adapter 127 supplies, for example, AC power supplied from a commercial power supply or the like to the battery coupler 124.

The power supply selection unit 111 may detect the output voltages of the battery 120 and the battery coupler 124 and determine the power supply having the larger voltage that is suppliable, among the battery 120 and the battery coupler 124, as the power supply used for the operation of the imaging apparatus 100.

Data on Electric Power

The imaging apparatus 100 has at least two operation (imaging) modes. One is a mode (Operation Mode 1, normal mode) in which all functions of the imaging apparatus 100 can be used. The other is a mode (a mode after Operation Mode 2, restricted mode) in which usable functions are limited as compared with the normal mode. In the restricted mode, control is performed so that some predetermined functions among functions usable in the normal mode cannot be used (use is prohibited).

FIG. 2 is an explanatory diagram of power data 201 and 202 which is data on an electric power. The control unit 101 acquires information on power consumption in each operation mode based on the power data 201 and the power data 202 recorded in the nonvolatile memory 103.

The power data 201 includes information on power consumption in a case where each function of the imaging apparatus 100 is used (turned ON) and in a case where each function is not used (turned OFF). Each function is, for example, a network, accessory shoe power supply, external microphone input, and lens power supply. The electric power is supplied to the network communication unit 116 when the network is ON, to the accessory communication unit 115 when accessory shoe power supply is ON, to the audio input unit 117 when external microphone input is ON, and to the lens unit 106 when lens power supply is ON. The function and power consumption illustrated in the power data 201 are merely examples. For example, the power data 201 may include power consumption when functions such as high luminance display of the display unit 107 and output by the image output unit 114 are turned ON and OFF.

The power data 202 includes information on total electric power (sum of power consumption of each function) in each operation mode. In the power data 202, the functions of the network, the accessory shoe power supply, the external microphone input, and the lens power supply are shown as ON/OFF, but this is also merely an example. In the power data 202, information may be recorded not in binary such as ON/OFF but in a continuous data string, a function format, or the like.

In Operation Mode 1, all functions of the imaging apparatus 100 can be used. A total electric power P1 in Operation Mode 1 in which all the functions are turned on is 68 [W] (in the power data 201, 5+3+2+8+50=68). In Operation Mode 2, the functions of the accessory shoe power supply and the external microphone input are turned OFF, and other functions are turned ON. A total electric power P2 in Operation Mode 2 is 63 [W]. In Operation Mode 3, functions of the accessory shoe power supply and the lens power supply are turned OFF, and other functions are turned ON. A total electric power P3 in Operation Mode 3 is 57.3 [W]. As described above, in Operation Mode 2, since the functions that can be used in Operation Mode 1 are restricted, the power consumption is smaller than that in Operation Mode 1 by the electric power necessary for the restricted functions. Also, in Operation Mode 3, since the functions that can be used in Operation Mode 1 are restricted, the power consumption is smaller than that in Operation Mode 1 by the electric power necessary for the restricted functions.

Data on Power Supply

FIG. 3 is an explanatory diagram of data on a power supply. Battery information 301 is information acquired by the power supply selection unit 111 (control unit 101) from the battery 120 connected to the imaging apparatus 100. The battery information 301 includes a battery ID, a capacity [%], a voltage [V], a consumption current [mA], and a dischargeable remaining amount [mAh]. The power supply selection unit 111 calculates the electric power that is suppliable by the battery 120, for example, from the voltage [V] and the consumption current [mA].

Further, the power supply selection unit 111 may acquire the electric power that is suppliable by the battery 120 with reference to information table 302. The information table 302 indicates a rated power [W], a rated voltage [V], and a rated current [A] for each battery ID and is recorded in the nonvolatile memory 103. The power supply selection unit 111 refers to the information table 302 based on the battery ID acquired from the battery information 301 and can acquire an electric power that is suppliable by the battery 120.

The power supply selection unit 111 can acquire the remaining amount of the battery 120 from the capacity [%] of the battery information 301. Furthermore, the power supply selection unit 111 can calculate the drivable time of the imaging apparatus 100 by the following calculation formula (Formula 1).

$$\text{Drivable time (min)} = \text{Dischargeable remaining amount (mAh)}/\text{Current consumption (mA)} \times 60 \quad \text{(Equation 1)}$$

Coupler information 311 is information acquired by the power supply selection unit 111 from the battery coupler 124 connected to the imaging apparatus 100. The coupler information 311 includes a battery coupler ID, a voltage [V], and a consumption current [mA]. The information table 312 indicates a rated power [W], a rated voltage [V], and a rated current [A] for each battery coupler ID and is recorded in the nonvolatile memory 103. The power supply selection unit 111 may calculate the electric power that is suppliable by the battery coupler 124 from the voltage [V] and the consumption current [mA] in the coupler information 311 or may acquire the electric power by referring to the information table 312.

Figure 4:
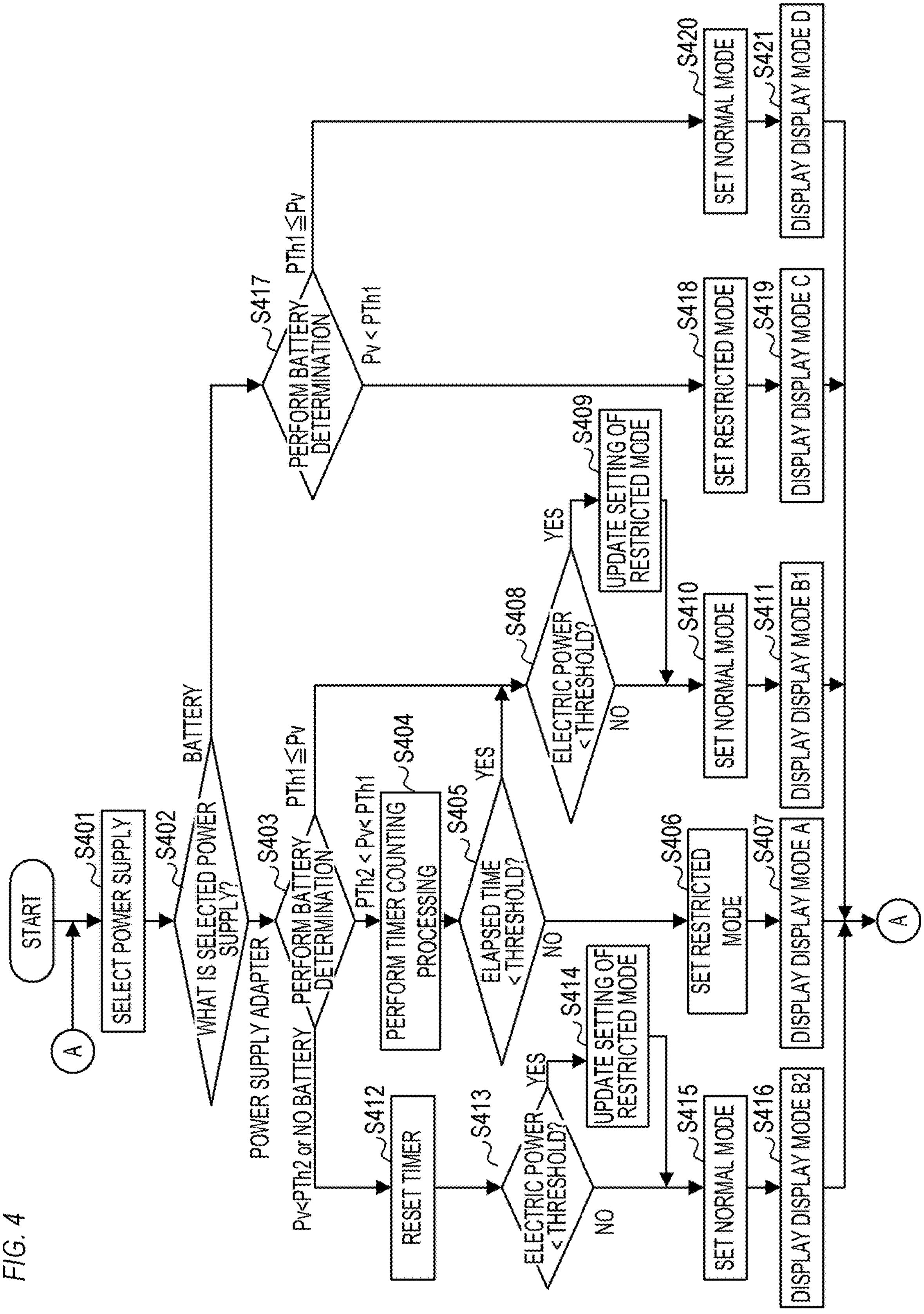
FIG. 4 is a flowchart illustrating an operation of an imaging apparatus.

FIG. 4 is a flowchart illustrating an example of the operation of the imaging apparatus 100. The operation is implemented by loading a program recorded in the nonvolatile memory 103 into the memory 102 and executing the program by the control unit 101 For example, when the power supply of the imaging apparatus 100 is turned on, the operation of FIG. 4 is started and repeatedly executed. The repetition timing may be controlled by synchronous processing by a periodic timer or may be controlled by asynchronous processing triggered by an event related to a series of operations. Furthermore, in the following description, as illustrated in FIG. 1A, the imaging apparatus 100 to which the battery 120 and the power supply adapter 123 can be connected is described. In addition, Operation Mode 1 illustrated in FIG. 2 is set as the normal mode, and Operation Mode 2 and Operation Mode 3 are set as the restricted modes.

In step S401, the control unit 101 (power supply selection unit 111) determines the power supply used for the operation of the imaging apparatus 100. When the battery 120 and the power supply adapter 123 are connected, as described above, the power supply selection unit 111 detects the output voltage of the battery 120 and the output voltage of the power supply adapter 123, and sends the detection result to the control unit 101. The control unit 101 determines a power supply having a larger output voltage (a power supply having a larger suppliable electric power) among the battery 120 and the power supply adapter 123 as a power supply used for the operation of the imaging apparatus 100. When the battery 120 is connected and the power supply adapter 123 is not connected, the battery 120 is selected as the power supply. In addition, when the power supply adapter 123 is connected and the battery 120 is not connected, the power supply adapter 123 is selected as the power supply.

Note that as illustrated in FIG. 1B, when the battery 120 is connected and the power supplying device is connected to the USB terminal 130, the control unit 101 communicates with the battery 120 and the power supplying device connected to the USB terminal 130 to acquire information on the power supply capability. In addition, as illustrated in FIG. 1C, when the battery 120 and the battery coupler 124 are connected, information on the power supply capability is acquired by performing communication with the battery 120 and the battery coupler 124. The information on the battery 120 may be information indicating electric power that is suppliable by the battery 120 or may be information indicating an ID (identifier) of the battery 120. When the information indicating the ID of the battery 120 is acquired, the control unit 101 refers to the information table 302 (312) in FIG. 3 and acquires an electric power that is suppliable by the battery 120.

In step S402, the control unit 101 determines whether the power supply determined in step S401 is the battery 120. The processing proceeds to step S417 when the power supply determined in step S401 is the battery 120, and the processing proceeds to step S403 when the power source is the power supply adapter 123. Note that the determination in step S402 may be interpreted as determination of whether the power supply used for the operation of the imaging apparatus 100 is a battery.

In step S403, the control unit 101 compares an electric power (Pv) that is suppliable from the battery 120 with threshold powers PTh1 and PTh2. Here, the rated power illustrated in FIG. 3 is an electric power that is suppliable by the battery 120. The processing proceeds to step S408 when the electric power that is suppliable by the battery 120 is the threshold power PTh1 or more, and the processing proceeds to step S404 when the electric power is larger than the threshold power PTh2 and smaller than the threshold power PTh1. When the electric power that is suppliable by the battery 120 is smaller than the threshold power PTh2, or when the battery 120 is not connected and only a power supply (for example, the power supply adapter 123) other than the battery 120 is connected, the processing proceeds to step S412.

The threshold power PTh1 is a value larger than the total electric power P1 (68 [W]) in the normal mode (Operation Mode 1 in FIG. 2), and is, for example, 70 [W]. The threshold power PTh2 is a lower limit value of the power consumption necessary for operating in the restricted mode (Operation Mode 2 or Operation Mode 3 in FIG. 2). When there are a plurality of restricted modes, the threshold power PTh2 may be a lower limit value of the total electric power of a specific restricted mode or may be a lower limit value of the total electric power of a mode having the highest total electric power among the restricted modes (for example, a value larger than P2 and smaller than P1). The threshold powers PTh1 and PTh2 may be determined in consideration of the stability and error of the power supply.

In step S404, the control unit 101 performs processing (timer counting processing) of measuring elapsed time from attachment of the battery 120. The timer count processing may be interpreted as processing of measuring elapsed time after it is determined that the electric power that is suppliable by the battery 120 is smaller than the threshold power PTh1. When the processing of step S404 is executed for the first time after step S412, the control unit 101 records the current time acquired from the system clock as the power supply attachment time in the memory 102. When executing the processing of step S404 again, the control unit 101 calculates the difference between the updated current time and the power supply attachment time and measures the elapsed time.

In step S405, the control unit 101 determines whether the elapsed time measured in step S404 is less than the threshold time. When the elapsed time is less than the threshold time, the processing proceeds to step S408. Otherwise, the processing proceeds to step S406. The threshold time is, for example, 4 seconds. The threshold time may be determined based on the time required for attaching and detaching the battery 120.

In step S406, the control unit 101 sets the restricted mode. When there are a plurality of restricted modes, a specific restricted mode may be set, or a restricted mode selected by the user may be set. In addition, a mode of the setting updated by the processing in step S409 or step S414 described below may be set.

In step S407, the control unit 101 displays the GUI screen in a display mode A. The display mode A is described below with reference to FIG. 5A.

In step S408, the control unit 101 detects the power consumption in the current operation mode of the imaging apparatus 100. Here, the control unit 101 sets the operation mode to the normal mode until the operation mode is set in any one of S415, S406, S410, S418, and S420 after the power is turned on. Then, the control unit 101 determines whether the power consumption in the current operation mode is smaller than a threshold power PTh3. The processing proceeds to step S409 when the current power consumption is smaller than the threshold power PTh3. Otherwise, the processing proceeds to step S410. The threshold power PTh3 used for the determination in step S408 is, for example, the threshold power PTh1, but may be a value determined in consideration of a calculation error of power consumption. The threshold power PTh3 is, for example, a value of the threshold power PTh1 or less.

In step S409, the control unit 101 updates the setting of the restricted mode so that the function executed in the state where the power consumption is smaller than the threshold power PTh3 in the normal mode can be executed. For example, the control unit 101 updates the setting of the restricted mode so that the function currently set to be turned ON is set to be turned ON in preference to other functions. As a result, when the setting is switched from the normal mode to the restricted mode, it is possible to reduce the time and effort required for the user to set the function executed in the normal mode to be executable even in the restricted mode.

In step S410, the control unit 101 sets the normal mode.

In step S411, the control unit 101 displays the GUI screen in a display mode B1. The display mode B1 is described below with reference to FIG. 5B.

According to the processing of steps S401 to S403, S406, and S410, control is performed as follows. When the power supply adapter 123 is determined as the power supply to be used for the operation of the imaging apparatus 100, and the battery 120 is connected, if the electric power that is suppliable by the battery 120 is larger than the threshold power PTh1, the control unit 101 sets the normal mode. When the electric power that is suppliable by the battery 120 is smaller than the threshold power PTh1, the control unit 101 sets the restricted mode. The control unit 101 sets the operation mode of the imaging apparatus 100 based on the electric power of the power supply (the power supply having the smaller suppliable electric power) that is not the power supply used for the operation of the imaging apparatus 100. As a result, even when the plug of the power supply adapter 123 is unplugged from the connector 119, the supply of the electric power from the power supply adapter 123 is momentarily interrupted, and the power supply used in the imaging apparatus 100 is switched to the battery 120 which has the suppliable power smaller than the threshold power PTh1, the electric power supply for maintaining the operation of the imaging apparatus 100 in the restricted mode can be covered by the battery 120, and the function being executed by the imaging apparatus 100 can be prevented from being stopped.

According to the processing of steps S404 to S406 and S410, the control unit 101 sets the normal mode until the elapsed time from the determination that the electric power that is suppliable by the battery 120 is smaller than the threshold power PTh1 reaches the threshold time. The control unit 101 sets the restricted mode when the elapsed time reaches the threshold time. Since the switching to the restricted mode is suspended until the elapsed time reaches the threshold time, the function can be prevented from being restricted when a battery having a suppliable electric power smaller than the threshold power PTh1 is erroneously mounted to the imaging apparatus 100.

In step S412, the control unit 101 resets the power supply attachment time recorded in step S404.

The processing in steps S413 to S415 is the same as the processing in steps S408 to S410. The control unit 101 sets the normal mode when only the power supply adapter 123 is connected to the imaging apparatus 100.

In step S416, the control unit 101 displays the GUI screen in a display mode B2. The display mode B2 is described below with reference to FIG. 5B.

In step S417, the control unit 101 compares the electric power (Pv) that is suppliable from the battery 120 with threshold power PTh1. When the electric power that is suppliable by the battery 120 is the threshold power PTh1 or more, the processing proceeds to step S420. Otherwise, the processing proceeds to step S418. Although not shown in S417, when the electric power that is suppliable by the battery 120 is smaller than the threshold power PTh2, it is desirable to stop this processing flow.

The processing in steps S418 and S420 is the same as the processing in steps S406 and S409. When the battery 120 is determined as the power supply to be used for the operation of the imaging apparatus 100, if the electric power that is suppliable by the battery 120 is larger than the threshold power PTh1, the control unit 101 sets the normal mode. When the electric power that is suppliable by the battery 120 is smaller than the threshold power PTh1, the control unit 101 sets the restricted mode.

In step S419, the control unit 101 displays the GUI screen in a display mode C. The display mode C is described below with reference to FIG. 5C.

In step S421, the control unit 101 displays the GUI screen in a display mode D. The display mode D is described below with reference to FIG. 5D.

When the power supply adapter 123 is selected as the power supply to be used by the imaging apparatus 100, the power supply selection unit 111 determines whether the electric power is supplied from the power supply adapter 123. Also, when determining that the supply of the electric power from the power supply adapter 123 is stopped, the power supply selection unit 111 notifies the control unit 101 of the stop, selects the battery 120 as a power supply, and sends the electric power from the battery 120 to the power supply unit 112. As described above, when the power supply adapter 123 is selected as a power supply, if the power supply adapter 123 is removed, the power supply is switched to the battery 120 and processing of the imaging apparatus 100 is continued using the power from the battery 120.

In the example of FIG. 4, as illustrated in FIG. 1A, the imaging apparatus that can connect the power supply adapter 123 and the battery 120 is described, but the present invention is not limited thereto, and the configurations of FIGS. 1B and 1C can also be adopted.

When the configuration of FIG. 1B is adopted, in S401, the control unit 101 determines which power supply is to be used as the power supply of the imaging apparatus 100 based on the electric power of the battery 120 and the information of the electric power that is suppliable by the power supplying device connected to the USB terminal 130. Then, when the selected power supply is the power supplying device connected to the USB terminal 130, the processing of S403 and subsequent processing are performed. In this case, the power supply adapter 123 in FIG. 4 is processed as a power supplying device connected to the USB terminal 130.

Furthermore, when the configuration of FIG. 1C is adopted, in S401, the control unit 101 determines which power supply is to be used as the power supply of the imaging apparatus 100 based on the information of the electric power that is suppliable by the battery 120 and the information of the electric power that is suppliable by the battery coupler 124. Also, when the selected power supply is the battery coupler 124, the processing of S403 and subsequent processing are performed. In this case, the processing is performed using the power supply adapter 123 of FIG. 4 as the battery coupler 124.

Furthermore, when the configuration of FIGS. 1B and 1C is adopted, in step S401, the control unit 101 determines the power supply used for the operation of the imaging apparatus 100 based on the information of the electric power that is suppliable by the power supply connected to the imaging apparatus 100, but may determine the power supply used for the operation of the imaging apparatus 100 based on the identification information of the power supply. For example, when the configuration of FIG. 1C is adopted, the control unit 101 may determine the battery coupler 124 as the power supply used for the operation of the imaging apparatus 100 in preference to the battery 120 based on the identification information.

Furthermore, in any configuration of FIGS. 1A to 1C, the control unit 101 may determine a predetermined power supply among a plurality of connected power supplies as the power supply used for the operation of the imaging apparatus 100.

For example, in the configuration of FIG. 1A, when the battery 120 and the power supply adapter 123 are connected, the power supply adapter 123 may be determined as the power supply used for the operation of the imaging apparatus 100. Note that, when the power supply adapter 123 is selected as the power supply used for the operation of the imaging apparatus 100, if the electric power that is suppliable by the power supply is smaller than the threshold power PTh2, the control unit 101 may set the restricted mode instead of the normal mode in step S415.

Further, the configuration of FIG. 1A may be a configuration in which the plurality of batteries 120 can be connected. For example, when the power supply adapter 123 is not connected, and two batteries are connected as the battery 120, in step S403, the control unit 101 compares the electric power suppliable by the battery having the smaller suppliable electric power with the threshold powers PTh1 and PTh2. This is to reduce the risk of instantaneous power interruption of the imaging apparatus 100 by switching the power supply of the imaging apparatus 100 to the other battery when the supply of the electric power from the battery is stopped while the imaging apparatus 100 operates using the battery having the larger suppliable electric power. In addition, when the power supply adapter 123 is connected, and two batteries are connected as the battery 120, in step S403, the control unit 101 compares the power that is suppliable by the battery having the larger electric power that is suppliable, with the threshold powers PTh1 and PTh2. This is because the imaging apparatus 100 operates using the power supply adapter 123, but when the supply of the electric power from the power supply adapter 123 is stopped, the imaging apparatus 100 operates using the battery having the larger power that is suppliable.

FIGS. 5A to 5D are schematic diagrams of a GUI screen displayed on the display unit 107.

Figure 5A:
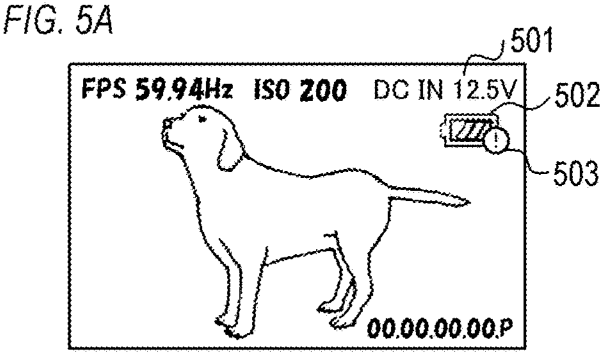
FIGS. 5A to 5D are schematic diagrams of GUI screens.

FIG. 5A is a schematic diagram of a GUI screen in the display mode A. The display mode A is a mode that is displayed, for example, when the power supply adapter 123 is determined as the power to be used for the operation of the imaging apparatus 100, and the electric power that is suppliable by the battery 120 is larger than the threshold power PTh2 and smaller than the threshold power PTh1. In an upper portion of the display unit 107, adapter information 501 "DC IN 12.5 V" is displayed as information on the power supply adapter 123.

In addition, under the adapter information 501, a battery icon 502 is displayed as information on the battery 120. Since the electric power that is suppliable from the battery 120 is smaller than the threshold power PTh1, as the information on the battery 120, a mark 503 indicating "!" is also displayed. In the example of FIG. 5A, the mark 503 is displayed on the battery icon 502 in a superimposed manner. However, a mark other than "!" may be displayed in a superimposed manner. A battery icon in a form (for example, different shapes or colors) different from the battery icon 502 may be displayed. As a result, it is possible to indicate to the user that the mounted battery is different from a normal battery (a battery having a suppliable electric power larger than the threshold power PTh1).

Figure 5B:
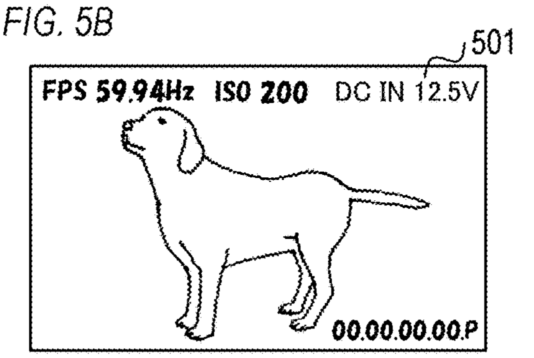

FIG. 5B is a schematic diagram of a GUI screen in the display mode B1. The display mode B1 is a mode that is displayed, for example, when the power supply adapter 123 is determined as the power to be used for the operation of the imaging apparatus 100, and the electric power that is suppliable by the battery 120 is larger than the threshold power PTh1. The adapter information 501 is displayed on the upper portion of the display unit 107. Since the electric power that is suppliable by the battery 120 is larger than the threshold power PTh1, the information on the battery 120 is not displayed in the display mode B1.

FIG. 5B is also a schematic diagram of a GUI screen in the display mode B2. The display mode B2 is a mode that is displayed, for example, when the power supply adapter 123 is determined as a power supply used for the operation of the imaging apparatus 100, and the battery 120 is not mounted (alternatively, the electric power that is suppliable by the battery 120 is smaller than the threshold power PTh2).

Although the GUI screen in the display mode B1 and the GUI screen in the display mode B2 are the same, the GUI screens may not be the same. For example, an item indicating that a normal battery is mounted may be displayed in the display mode B1, and the item may not be displayed in the display mode B2.

Figure 5C:
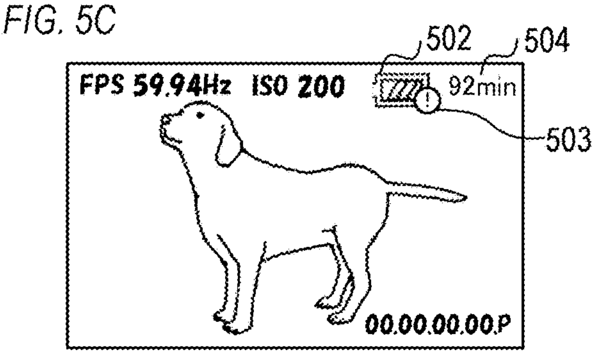

FIG. 5C is a schematic diagram of a GUI screen in the display mode C. The display mode C is a mode that is displayed, for example, when the battery 120 is determined as the power supply to be used for the operation of the imaging apparatus 100, and the electric power that is suppliable by the battery 120 is larger than the threshold power PTh2 and smaller than the threshold power PTh1.

When the battery 120 is determined as the power supply used for the operation of the imaging apparatus 100 (display mode C) and when the power supply adapter 123 is determined as the power supply (display mode A), different information is displayed as the information on the battery 120. In FIG. 5C, as the information on the battery 120, time 504 that is a period of time during which the battery 120 can be driven is displayed in addition to the battery icon 502 and the mark 503. A battery icon in a form different from the battery icon 502 may be displayed. As a result, it is possible to indicate to the user that the battery 120 is a power supply used for the operation of the imaging apparatus 100.

Figure 5D:
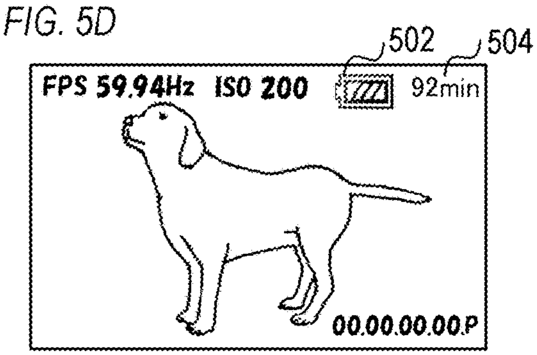

FIG. 5D is a schematic diagram of a GUI screen in the display mode D. The display mode D is a mode that is displayed, for example, when the battery 120 is determined as the power supply to be used for the operation of the imaging apparatus 100, and the electric power that is suppliable by the battery 120 is larger than the threshold power PTh1. In the display mode D, the battery icon 502 and the time 504 are displayed, but the mark 503 is not displayed because the electric power that is suppliable by the battery 120 is larger than the threshold power PTh1.

Note that in each display mode, when there is a function set to be turned OFF, the function may be displayed in a form different from the case where the function is set to be turned ON. For example, the icon indicating the function to be set to be turned OFF may be displayed in red. As a result, it is possible to indicate the presence or absence of the restriction of the function to the user.

Figure 6:
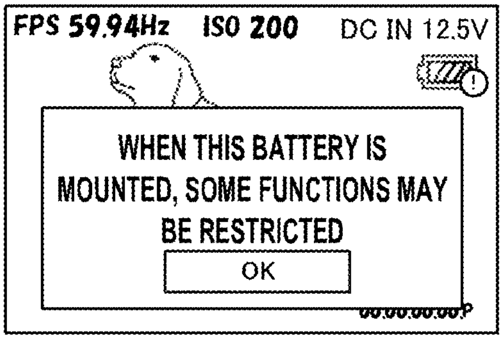
FIG. 6 is a schematic diagram of a warning screen.

FIG. 6 is a schematic diagram of a warning screen displayed on the display unit 107. The warning screen displays information on the restricted mode. In the example of FIG. 6, a text indicating that some functions are limited is displayed on the warning screen. The warning screen is displayed for a predetermined period of time at a timing when the restricted mode is first set after the battery 120 having the suppliable electric power larger than the threshold power PTh2 and smaller than the threshold power PTh1 is mounted on the imaging apparatus 100, and the imaging apparatus 100 is activated, and then the display is stopped. Note that, after being displayed once at this timing, the warning screen may not be displayed again until the imaging apparatus 100 is initialized. In addition, the warning screen may include other information, for example, information such as a set operation mode, a list of restricted functions, and threshold time determined in step S405. The battery icon 502 may be controlled to blink at the timing when the warning screen is displayed. By displaying the warning screen in addition to the GUI screen illustrated in FIGS. 5A to 5D, it is possible to more clearly indicate the set operation mode to the user.

As described above, in the present embodiment, when a plurality of power supplies are connected to the imaging apparatus 100, the operation mode of the imaging apparatus 100 is set based on the electric power that is suppliable by the power supply having the smaller power that is suppliable. As a result, the risk of instantaneous power interruption of the imaging apparatus 100 can be reduced. In addition, information on the power supply is displayed according to each operation mode. As a result, it is possible to indicate the set operation mode to the user.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present invention are also included in the present invention. The present invention also includes other configurations obtained by suitably combining various features of the embodiment.

Furthermore, in the above-described embodiment, the case where the present invention is applied to the imaging apparatus is described as an example, but the present invention is not limited to this example and can be applied to any electronic device as long as a plurality of power supplies can be connected to the electronic device. For example, the present invention can also be applied to a portable game machine.

According to the present invention, even when the supply of the electric power is instantaneously stopped, the function being executed is not stopped.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-031911, filed on Mar. 4, 2024, which is hereby incorporated by reference herein in its entirety.

What is claimed is:

1. An electronic device comprising:

a processor; and a memory storing a program which, when executed by the processor, causes the electronic device to function as:

an acquisition unit that acquires information on a power supply connected to the electronic device;

a determination unit that determines a power supply to be used for an operation of the electronic device; and a setting unit that sets, as an operation mode of the electronic device, any of a plurality of operation modes including a first operation mode and a second operation mode in which a function that is usable is restricted as compared with the first operation mode, wherein in a case where a first power supply and a second power supply are connected to the electronic device, the acquisition unit acquires first information on the first power supply and second information on the second power supply, and the determination unit determines a power supply having a larger suppliable electric power among the first power supply and the second power supply as the power supply to be used for the operation of the electronic device based on the first information and the second information, in a case where the second power supply is determined as the power supply to be used for the operation of the electronic device, the setting unit sets the operation mode of the electronic device in accordance with a first electric power that is suppliable by the first power supply such that if the first electric power is larger than a threshold power, the first operation mode is set, and if the first electric power is smaller than the threshold power, the second operation mode is set, and in a case where the second power supply is connected to the electronic device, and the first power supply is not connected to the electronic device, the first operation mode is set.

2. The electronic device according to claim 1, wherein the information on the power supply connected to the electronic device is an output voltage of the power supply, and the determination unit determines a power supply having a higher output voltage among the first power supply and the second power supply as the power supply to be used for the operation of the electronic device.

3. The electronic device according to claim 1, wherein the information on the power supply connected to the electronic device indicates electric power that is suppliable by the power supply.

4. The electronic device according to claim 1, wherein the information on the power supply connected to the electronic device indicates an identifier of the power supply.

5. The electronic device according to claim 1, wherein the first power supply is a battery, the second power supply is a power supply adapter that supplies electric power from a commercial power supply, and the first electric power is a rated power of the battery.

6. The electronic device according to claim 1, wherein the program, when executed by the processor, further causes the electronic device to function as a display control unit that performs control to display information on the first power supply.

7. The electronic device according to claim 6, wherein in a case where the second power supply is determined as the power supply to be used for the operation of the electronic device, if the first electric power is larger than the threshold power, the display control unit performs control so that the information on the first power supply is not displayed, and if the first electric power is smaller than the threshold power, the display control unit performs control so that the information on the first power supply is displayed.

8. The electronic device according to claim 7, wherein the display control unit performs control so that information to be displayed as the information on the first power supply differ between a case where the first power supply is determined as the power supply to be used for the operation of the electronic device and a case where the second power supply is determined as the power supply to be used for the operation of the electronic device.

9. The electronic device according to claim 1, wherein the electronic device is an imaging apparatus.

10. A control method of an electronic device comprising:

acquiring information on a power supply connected to the electronic device;

determining a power supply to be used for an operation of the electronic device; and setting, as an operation mode of the electronic device, any of a plurality of operation modes including a first operation mode and a second operation mode in which a function that is usable is restricted as compared with the first operation mode, wherein in a case where a first power supply and a second power supply are connected to the electronic device, first information on the first power supply and second information on the second power supply are acquired, and among the first power supply and the second power supply, a power supply having a larger suppliable electric power is determined as the power supply to be used for the operation of the electronic device based on the first information and the second information, in a case where the second power supply is determined as the power supply to be used for the operation of the electronic device, if a first electric power that is suppliable by the first power supply is larger than a threshold power, the first operation mode is set, and if the first electric power is smaller than the threshold power, the second operation mode is set, and in a case where the second power supply is connected to the electronic device, and the first power supply is not connected to the electronic device, the first operation mode is set.

11. A non-transitory computer readable medium that stores a program, wherein the program causes a computer to execute a control method of an electronic device, the control method comprising:

acquiring information on a power supply connected to the electronic device;

determining a power supply to be used for an operation of the electronic device; and setting, as an operation mode of the electronic device, any of a plurality of operation modes including a first operation mode and a second operation mode in which a function that is usable is restricted as compared with the first operation mode, wherein in a case where a first power supply and a second power supply are connected to the electronic device, first information on the first power supply and second information on the second power supply are acquired, and among the first power supply and the second power supply, a power supply having a larger suppliable electric power is determined as the power supply to be used for the operation of the electronic device based on the first information and the second information, in a case where the second power supply is determined as the power supply to be used for the operation of the electronic device, if a first electric power that is suppliable by the first power supply is larger than a threshold power, the first operation mode is set, and if the first electric power is smaller than the threshold power, the second operation mode is set, and in a case where the second power supply is connected to the electronic device, and the first power supply is not connected to the electronic device, the first operation mode is set.

* * * * *